April 16, 1963     J. S. CARREAU     3,085,826
STORAGE COMPARTMENT EXTENSIONS

Filed June 23, 1960     2 Sheets-Sheet 1

INVENTOR.
JOSEPH S. CARREAU
BY
Morgan, Finnegan, Durham & Pine
ATTORNEYS.

April 16, 1963

J. S. CARREAU 3,085,826

STORAGE COMPARTMENT EXTENSIONS

Filed June 23, 1960

INVENTOR.
JOSEPH S. CARREAU
BY
Morgan, Finnegan, Durham & Pine
ATTORNEYS.

United States Patent Office 3,085,826
Patented Apr. 16, 1963

3,085,826
STORAGE COMPARTMENT EXTENSIONS
Joseph S. Carreau, Fairway Apts., Apt. 3—0, Boston Post Road, Pelham Manor, N.Y.
Filed June 23, 1960, Ser. No. 38,310
1 Claim. (Cl. 296—37)

This invention is related to extensions for automobiles and more particularly is related to an extension of an automobile trunk for use in picnicking and carrying long items.

In recent years it has become customary for automobile users to use their automobiles in conjunction with picnics and other outdoor activities and for carrying items of varying sizes from one place to another.

In order that automobile users can use their automobiles in this fashion, it has become the practice to provide one type of means which cooperates with the automobile to form a table when the automobile is stationary and another type of means cooperating with the automobile to form a carrier of some type for carrying items when the automobile is moving.

There are known, for example, prior devices wherein a table is mounted on guides or runways within the trunk of the automobile so that the table can slide outwardly from the trunk to form an extension of the storage compartment. Typically these devices have required the use of closely dimensioned guide-ways, bearing and roller means for guiding the table during its movement. Some of these prior devices have included foldable leg means for supporting the table extension when in its extended position. These devices did, therefore, comprise a fairly large number of closely dimensioned parts which made the device difficult and expensive to manufacture. Such devices were large and bulky in construction so that when the extension was not in use and was assembled within the trunk or storage compartment, they left little trunk space for carrying luggage and groceries in everyday usage. In addition, where foldable leg means were provided, such devices obviously could not be used for carrying long items such as ladders or poles when the automobile was moving.

Also, where foldable legs were used it was difficult and ground was uneven, rocky or not horizontally level unless sometimes impossible to use these devices when the adjustable legs were provided, which added to the complexity of the device.

Other prior art devices for extending the effective area of the storage compartment comprises foldable table extension means including foldable legs for supporting the table extension when in use. These devices were located near the trunk and were mounted on the outside of the automobile frame. Therefore, although these devices were quite satisfactory as table extensions, they generally included a large number of parts making them difficult and expensive to manufacture. Where mounted near the trunk or storage compartment on the outside of the automobile, these extensions presented an undesirable and unsightly appearance which greatly reduced their appeal to prospective purchasers. These devices also were deficient in that they could not carry long items since the trunk extension could not be used when the car was moving.

In other prior devices it was frequently difficult to load the trunk compartment since a large trunk door was required which interfered with the loading operation.

In accordance with this invention a simple cantilever trunk extension is provided which, when the car is stationary, provides a sturdy and functional structure for use in picnics; and, when the car is moving, can be used for carrying long items. The extension is designed to permit easy loading of the trunk compartment and to eliminate a large number of parts normally used in prior extension devices by utilizing a simple cantilever construction in conjunction with normal automobile structure for supporting the table. In addition, when not in use, the extension of the present invention takes up a minimum of space within the trunk and is designed so that when assembled within the trunk the storage compartment extension forms the rear wall of the storage compartment and lockingly engages the trunk compartment door. The present invention would be particularly useful to persons who are travelling and desire to stop by the roadside and eat their lunch.

With the foregoing in mind the present invention has the following objects.

An object of this invention is to provide a cantilever storage compartment extension which is economical to manufacture and simple in construction.

Another object of this invention is to provide a storage compartment extension which can extend the effective carrying space of a storage compartment.

Another object of this invention is to provide a single device which can be used as a buffet or table when the automobile is stationary and as a trunk extension for carrying long items when the automobile is moving.

A further object of the present invention is to provide a storage compartment extension which in one position will extend the effective carrying space of the storage compartment and which in another position can be folded within the storage compartment in a space saving manner.

A further object of this invention is to provide a trunk extension for a trunk compartment having a door which cooperates with the trunk compartment and door so that the trunk can be easily loaded.

It is a further object of the present invention to provide a storage compartment extension wherein a portion of the extension cooperates with the automobile for supporting the extension when in its extended condition.

Another object of this invention is to provide a storage compartment extension wherein the extension, when in its folded position within the storage compartment, forms the rear wall of the storage compartment.

Yet another object of the present invention is to provide a storage compartment extension wherein the portion of the extension which supports the extension when in its extended position serves as the outwardly facing rear wall of the storage compartment when in its folded position.

In accordance with this invention means are provided for forming an extension of a storage compartment which can be used for carrying long items and which forms a portion of the exterior of the storage compartment when not in use.

Briefly described, this means comprises a table portion pivotally attached to the rear of an automobile having at one end a second table portion, the first table portion having a surface which will support the first and second table parts when in their extended position and will form the rear wall of the storage compartment when the table parts are in their folded condition.

The invention consists in the novel parts, constructions, arrangements, combinations and improvements shown and described.

The accompanying drawings, which are incorporated in and constitute a part of this specification, illustrate one embodiment of the invention, and together with the description, serve to explain the principles of the invention.

Figure 1:
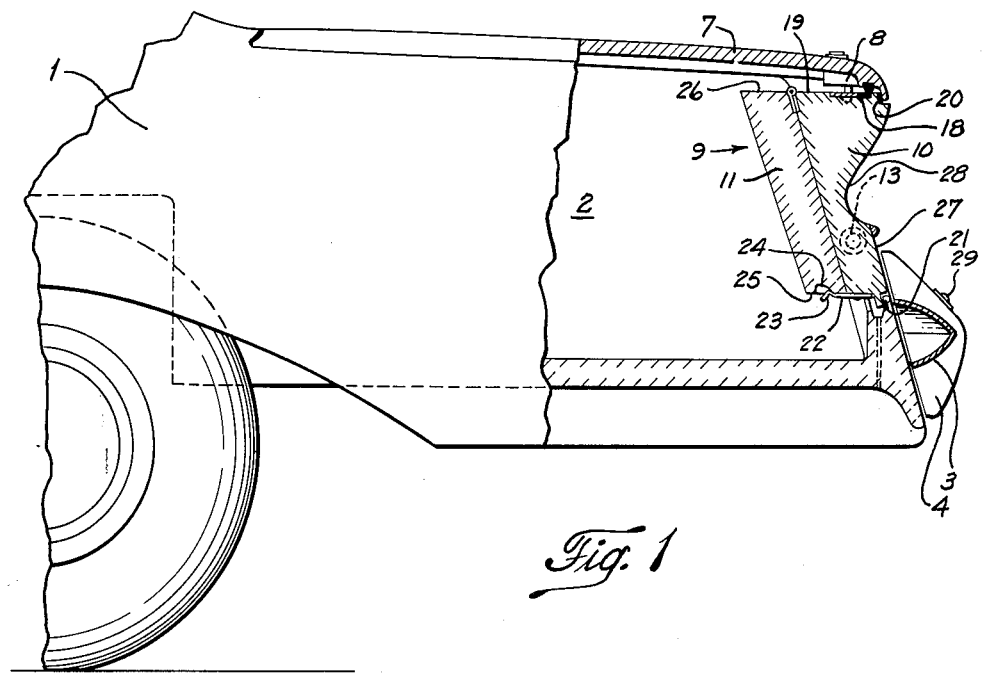
FIGURE 1 is a side elevation, partly broken away, of the rear end of an automobile showing the storage compartment extension in its folded position within the trunk.

It is to be understood that both the foregoing general description and the following detailed description are exemplary and explanatory, but are not restrictive of the invention.

Reference will now be made in detail to the present preferred embodiment of the invention, an example of which is illustrated in the accompanying drawings.

The present invention is for use with modern automobiles of the type wherein a car body 1 is provided with a conventional storage space or trunk 2 at one end thereof. The car body also has a bumper means 3 having conventional bumper guards 4 spaced axially and transversely of the bumper 3. Located intermediate the bumper 3 and the taillight 5 is a curved panel plate 6. The car body 1 has attached thereto in a conventional manner a trunk door 7 which includes a latch means 8 for maintaining the door in its closed position.

It is well known that the usual trunk is not adapted for effectively and easily carrying long items such as poles or ladders nor is the trunk normally usable as a buffet extension for use during camping or picnicking activities. It is also known that the large trunk door provided on the usual trunk compartment frequently makes it difficult to load the trunk compartment. In accordance with this invention means are provided for extending the effective carrying area of the trunk so that it can be easily loaded and used either to carry long items or as a buffet extension in a simple and expeditious manner.

As herein embodied, this means comprises a table means 9 having a first part 10 and a second part 11 wherein the first table part 10 is pivotally attached to the automobile and the second table part 11 is pivotally attached to the first table part.

Means are provided for pivotally mounting the table means 9 for swinging movement on the car body whereby the table means 9 can be placed in folded position within the trunk (FIGURE 1) or in an unfolded or extended position (FIGURE 3) outside the trunk. This means comprises, as shown herein for purposes of illustration in FIGURE 2, which shows the means for only one side of the rear portion of the car for simplicity purposes, a bearing means 12 which is fixedly attached, by welding for example, to the first table part 10. Receivable withing the bearing means 12 is a pivot pin 13 having a head 14 thereon. The pivot pin head 14 is attached by some means, as for example bolt means 15, to a bearing 16 which is fixedly attached in any convenient manner to a flange 17 on the rear portion of the car body 1. In a manner which will be obvious to those skilled in the art, the first table part 10 and thus the table means 9 can be pivoted into and out of its FIGURE 1 and FIGURE 3 positions by the aforementioned means. It will be recognized by those skilled in the art that the other side of the rear portion of the automobile will be provided with similar means and that other and equivalent means may be used for connecting the table means to the automobile and that the present invention is not limited to the exact structural elements shown. For example, a single pivot pin, rather than two as disclosed, which extends transversely of the table means might be used.

Means are also provided for maintaining the table means 9, when the table parts 10 and 11 are in their folded position, within the storage space or trunk compartment 2. As herein embodied, and most clearly illustrated in FIGURES 1 and 3, the first table part 10 is provided with a latch plate 18 embedded, in any conventional manner, in the end face 19 which engages the second table part 11 when the table means 9 is in its extended position. The latch plate 18 cooperates with the conventional latch 8 on the trunk door for holding or maintaining the table parts in their folded position within the trunk. In order to prevent scratching or marring of the trunk door 7 or the first table part 10, when the table means is moved into its folded position, the first table part 10 is provided with a small piece or block 20 of resilient material, which may be rubber or the like, and the car body 1 is provided with a similar resilient piece or block 21.

By providing a storage compartment extension, of the type hereinafter described, having a latch plate 18 in the end face 19 there is provided a structure which eliminates the need for a trunk door which extends to the general area of the bumper 3. Thus, when the trunk door 7 is open and the table means 9 extended there is no danger that one loading the trunk compartment would come into contact with the open trunk door. It will be clear to those skilled in the art that the present invention is not limited to the locking devices herein shown and that other and equivalent means can be used.

In accordance with the invention, means are also provided for maintaining the first and second table parts in face-to-face relationship when the table parts are in their folded position in order to prevent the second table part from hanging or swinging loose thereby reducing the effective storage area in the trunk 2 during normal operation or damaging articles carried within the trunk when the table means 9 is not in use. This means, as herein embodied, comprises a thin strip of spring steel 22 of the like having a hook portion 23 at one end for latching engagement in a recess 24 in the free end face 25 of the second table part.

It has been conventional in other known forms of table extensions to provide leg supporting means for supporting the table extension in its extended position. This practice has increased the complexity and cost of the table extensions, has resulted in a diminution of the available trunk space when the table was in its folded position and has prevented the table from being used to carry long items when the automobile was moving. This practice has also produced an unattractive appearance to the car when the supporting means is located on the outside of the car body when not in use.

In accordance with this invention, means are provided for supporting the first and second table parts when in their horizontal extended position and for forming the rear surface of the storage compartment 2 when the table parts are in their folded position so that the table means can be used whether the automobile be moving or stationary.

Figure 2:
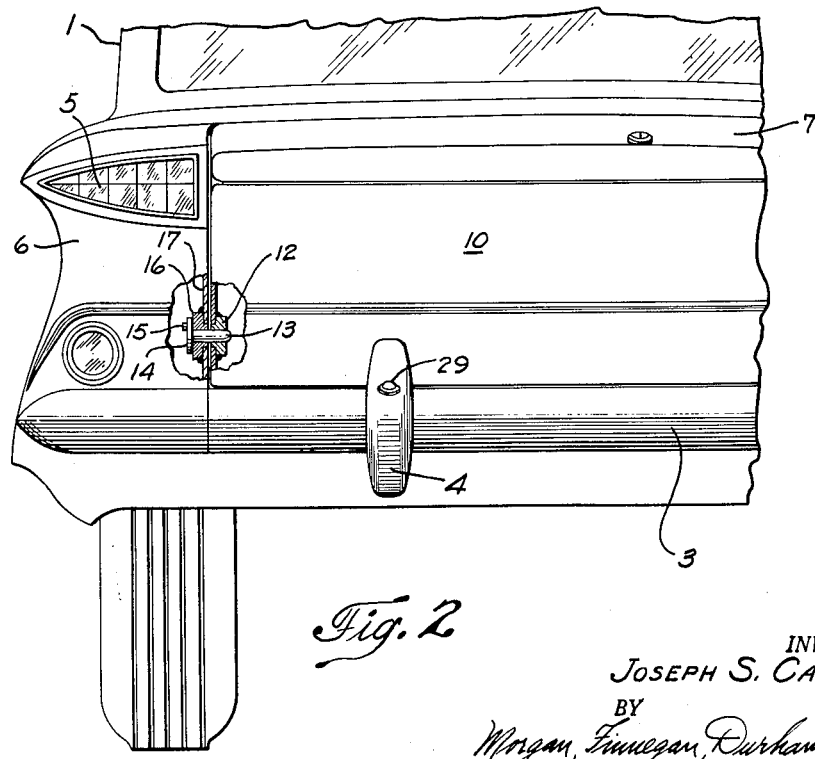
FIGURE 2 is an end view, partly broken away, of the end of the automobile construction shown in FIGURE 1.
Figure 3:
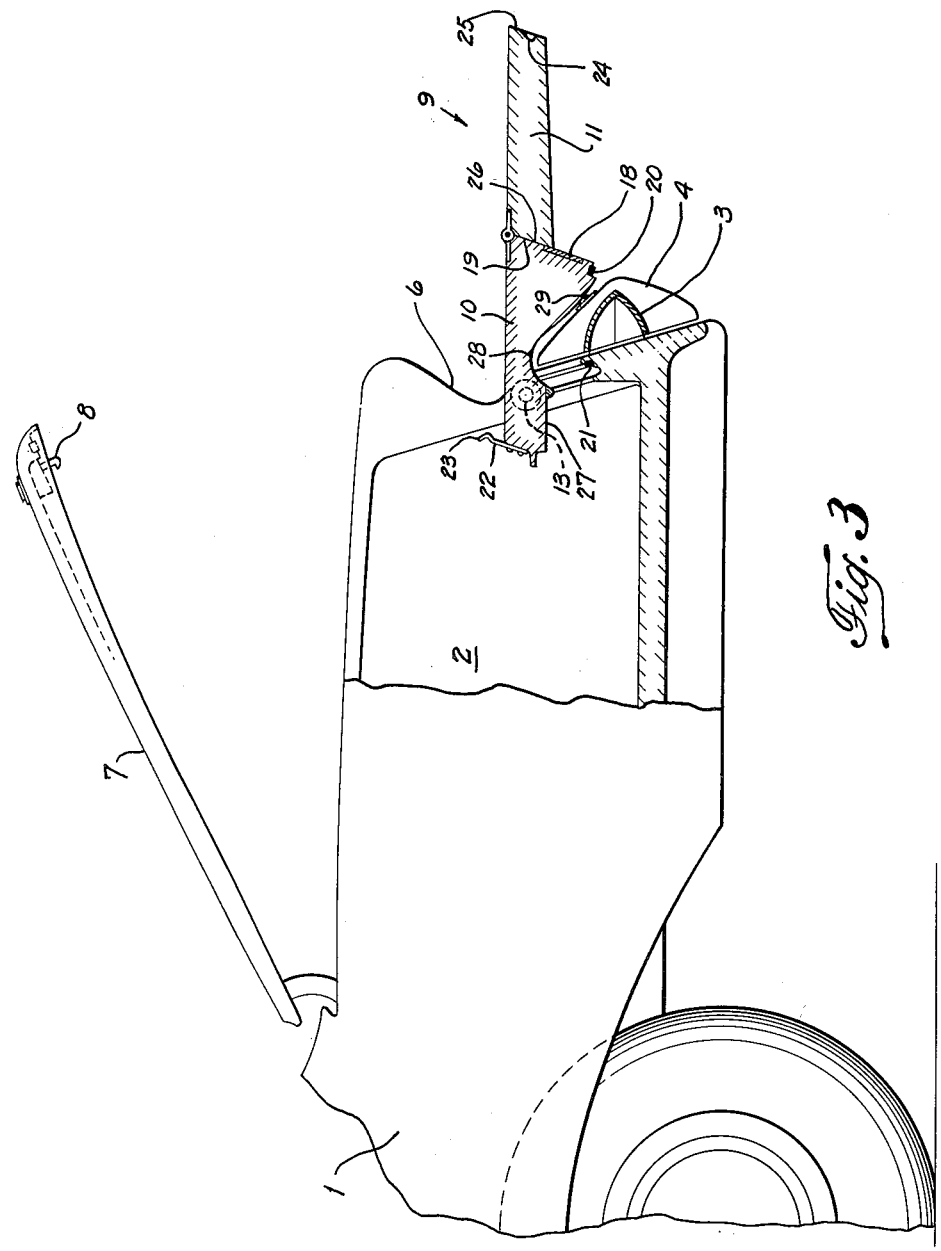
FIGURE 3 is a side elevation view similar to FIGURE 1 showing the storage compartment extension in its extended position.

This means, as embodied herein, includes, as clearly shown in FIGURES 1 and 3, the first table part 10 which is provided with an end face 19 for engaging the second table part and the second table part 11 which is provided with an end face 26 for engaging the first table part. The end face surfaces 19, 26 of the first and second table parts are formed at angles which are supplementary to each other so that the table parts when in their extended position form a substantially horizontal table.

The supporting surface and the storage compartment rear wall means, as herein embodied, comprises the surface 27 on the first table part 10 which has a curved recess 28 therein and a surface portion engaging the bumper guard engaging button 29. The curved recess 28 is provided so that the first table part 10, when in its extended position, will not engage or interfere with the end portion of the bumper guard 4. The engaging button 29, however, does engage the surface 27 as clearly shown in FIGURE 3 for supporting the first and second table parts when they are in their extended position.

By providing a surface on the first table part which supports the first and second table parts and through the use of the end engaging surfaces on the first and second table parts a simple compact cantilever structure is provided wherein the first and second table parts are maintained in their extended condition in a simple and expeditious manner and when folded within the trunk use only a minimum amount of space.

The table means in its extended position can be observed in FIGURE 3. In this position the table means can be used to carry long items, it can be used as a buffet extension for use during picnicking or camping, or it can be used to place luggage or other items thereon preliminary to being placed within the trunk compartment 2. When it is desired to fold the table within the trunk it is necessary first to pivot the second table part 11 into superimposed position on the first table part 10. When in this position, it will be obvious that the table means can still be used as a buffet extension if desired. However, to place the table means within the storage compartment the first and second table parts are pivoted together from the superimposed position to the position in FIGURE 1. It is clear from FIGURE 1 that in this position the table means forms the rear wall of the storage compartment 2 and the supporting surface 27 of the first table part forms the outwardly facing rear surface of the storage compartment 2 and may, preferably, merge with the automobile panel 6 so as to provide an attractive appearance. Thus, the surface 27 serves in one position of the table means as a supporting surface and in another position serves as the outwardly facing rear wall of the storage compartment.

The invention in its broader aspects is not limited to the specific mechanisms shown and described, but also includes within the scope of the accompanying claims any departures made from such mechanisms which do not sacrifice its chief advantages.

What is claimed is:

An automobile storage compartment extension in combination with an automobile frame having a bumper and bumper guard, said bumper guard extending above said bumper comprising a first plane surfaced table part pivotally connected to the automobile frame, a second plane surfaced table part pivotally connected to said first table part, said first and second table parts having adjacent end surfaces adapted to be placed in abutting relationship when said table parts are in a first position wherein said second table part forms a plane surfaced extension of said first table part, means comprising a recessed portion on said first table part adapted to accommodate said bumper guard, means supported by said bumper guard at a point spaced from the upper end of said guard to contact said recessed portion of said first table part at one point only to thereby support said first and second table parts when in said first position in spaced relation to said bumper guard, a recess in said abutting end of said first table part, a storage compartment door including a latch means which cooperates with said recess to lock said first and second table parts in a second position, said first table part forming the rear wall of said storage compartment when said first and second table parts are in said second position.

References Cited in the file of this patent
UNITED STATES PATENTS

| | | |
|---|---|---|
| 1,571,549 | Kerth | Feb. 2, 1926 |
| 1,632,672 | Obergfell | June 14, 1927 |
| 2,097,911 | Becker | Nov. 2, 1937 |
| 2,350,050 | Lim | May 30, 1944 |
| 2,382,011 | Howard | Aug. 14, 1945 |
| 2,789,861 | Hudson | Apr. 23, 1957 |
| 2,796,287 | Moyes | June 18, 1957 |